US008315938B1

(12) United States Patent
Forsythe (10) Patent No.: US 8,315,938 B1
(45) Date of Patent: Nov. 20, 2012

(54) OPTION ANALYSIS FOR A TRADING SYSTEM

(75) Inventor: Aric Forsythe, Chicago, IL (US)

(73) Assignee: OptionMonster Holdings, Inc., Chicago, IL (US)

( * ) Notice: Subject to any disclaimer, the term of this patent is extended or adjusted under 35 U.S.C. 154(b) by 113 days.

(21) Appl. No.: 12/905,009

(22) Filed: Oct. 14, 2010

Related U.S. Application Data

(60) Provisional application No. 61/279,392, filed on Oct. 19, 2009.

(51) Int. Cl.
*G06Q 40/00* (2012.01)
(52) U.S. Cl. ............................ 705/36 R; 705/35; 705/37
(58) Field of Classification Search ................ 705/35–37
See application file for complete search history.

(56) References Cited

U.S. PATENT DOCUMENTS

| 8,082,205 | B2 * | 12/2011 | Lutnick et al. ................ 705/37 |
| 8,200,569 | B1 * | 6/2012 | Zerenner et al. ............... 705/37 |
| 2005/0187851 | A1 * | 8/2005 | Sant ............................... 705/36 |
| 2006/0036531 | A1 * | 2/2006 | Jackson et al. ................. 705/37 |
| 2006/0047597 | A1 * | 3/2006 | Homer et al. ................... 705/37 |
| 2006/0088217 | A1 * | 4/2006 | Akoa et al. .................... 382/191 |
| 2007/0087756 | A1 * | 4/2007 | Hoffberg ....................... 455/450 |
| 2007/0130043 | A1 * | 6/2007 | O'Shaughnessy et al. . 705/36 R |
| 2010/0153300 | A1 * | 6/2010 | Kolton et al. ............... 705/36 R |
| 2011/0178953 | A1 * | 7/2011 | Johannes .................... 705/36 R |

* cited by examiner

*Primary Examiner* — Narayanswamy Subramanian
(74) *Attorney, Agent, or Firm* — Lempia Summerfield Katz LLC (57) ABSTRACT

A system for option analysis comprises a processor and a memory. The processor is configured to receive a selection of a strategy to analyze for an underlying security; calculate a spectral map data for the strategy for the underlying security; and provide the spectral map data for the strategy to a display. The memory is coupled to the processor and configured to provide the processor with instructions.

16 Claims, 13 Drawing Sheets

OPTION ANALYSIS FOR A TRADING SYSTEM

CROSS REFERENCE TO OTHER APPLICATIONS

This application claims priority to U.S. Provisional Patent Application No. 61/279,392 entitled OPTION ANALYSIS FOR A TRADING SYSTEM filed Oct. 19, 2009 which is incorporated herein by reference for all purposes.

BACKGROUND OF THE INVENTION

Analysis of option strategies is often difficult because it demands assimilating many pieces of data across various points in time to arrive at a useful insight. Many forms of analysis that could be useful are often not performed because the task is either too time consuming or too complex.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Option Analysis for a trading system is disclosed. Option Analysis is a tool that makes option pricing characteristics immediately understandable in the context of an underlying price chart (e.g., a price chart for an underlying investment—for example, a stock, an option, an exchange traded fund, a mutual fund, an index, a currency, an asset, etc.). In some embodiments, a Spectral Map, or a map of the value of a strategy at various points in time at various underlying values, is superimposed over the underlying price chart to create a visual depiction linking where the underlying may go in the future and the consequences on profit and loss or other parameters for the strategy. Option Analysis includes interactive components that allow a user to get more detailed information by interacting with the visual chart in various ways (e.g., selecting a point on the chart, drawing forecasts, display overlays, adjust parameters, etc.).

In some embodiments, Option Analysis is executed by first clicking on a position strategy to get an Action Menu, and then on the menu clicking the button for "Analysis." As a result of the click selection, the Option Analysis dialog appears with the Snapshot Analysis screen displayed. In some embodiments, Option Analysis is executed by clicking a strategy the user does not yet own but may wish to trade. In this case, an Action Menu appears. Then the user clicks the "Analysis" button on the menu to invoke the Option Analysis dialog.

Figure 1:
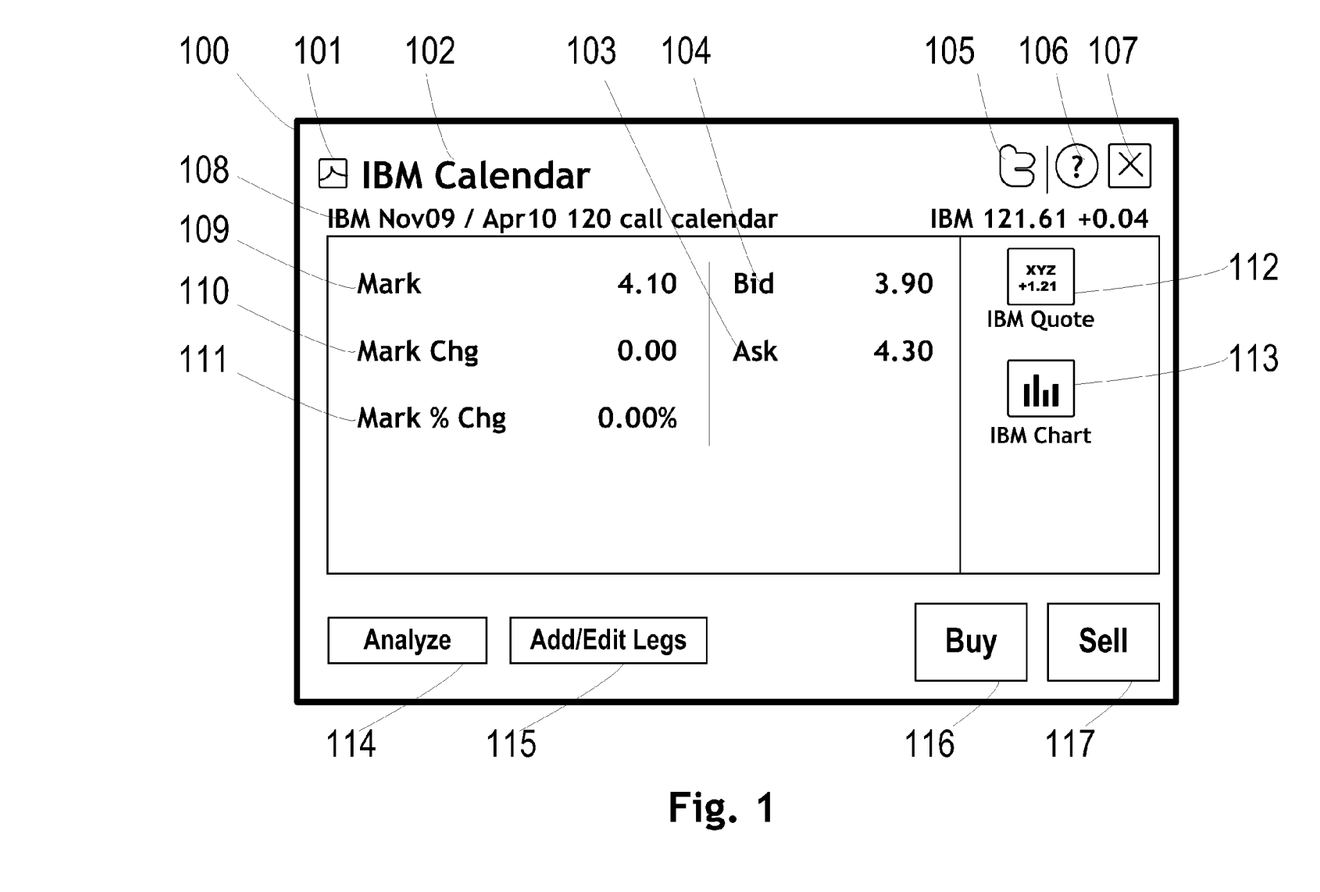
FIG. 1 is a screen shot illustrating an embodiment of an Action Menu for a strategy from which Option Analysis can be launched.

FIG. 1 is a screen shot illustrating an embodiment of an Action Menu for a strategy of interest that can be used to launch Option Analysis. In the example shown, the Action Menu shows a calendar strategy for IBM underlying. This strategy is a two legged spread; that is, it consists of two individual option contracts. Button 114 comprises a button that enables a user to invoke (e.g., when the button is pushed) Option Analysis.

Figure 2:
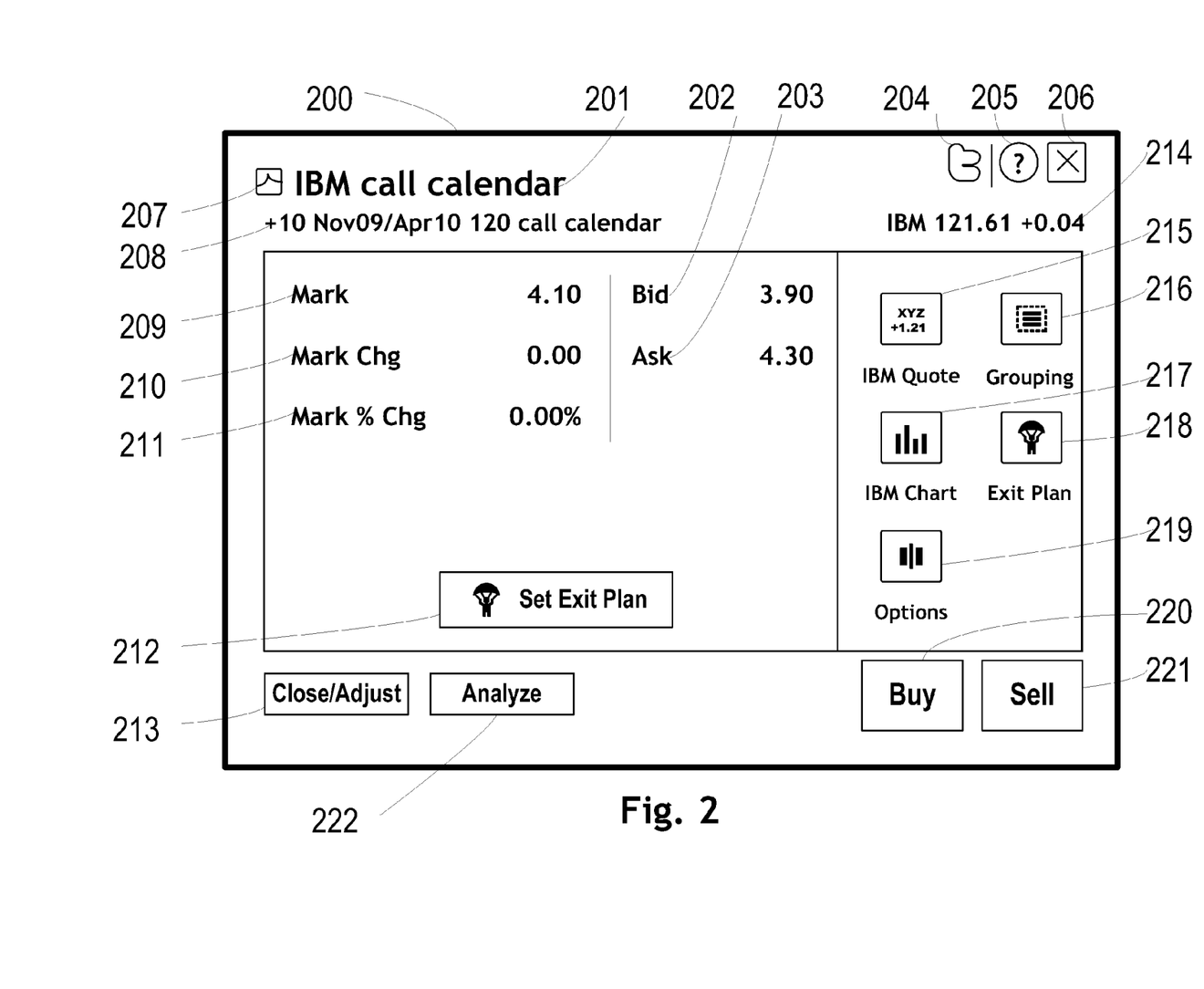
FIG. 2 is a screen shot illustrating an embodiment of an Action Menu for a held position from which Option Analysis can be launched.

FIG. 2 is a screen shot illustrating an embodiment of an Action Menu for a held position (that is, a position that is owned by the user in a trading account) that can be used to launch Option Analysis. In the example shown, the Action Menu shows a calendar strategy for IBM underlying. This strategy is a two legged spread; that is, it consists of two individual option contracts. Button 222 comprises a button that enables a user to invoke (e.g., when the button is pushed) Option Analysis.

Figure 3A:
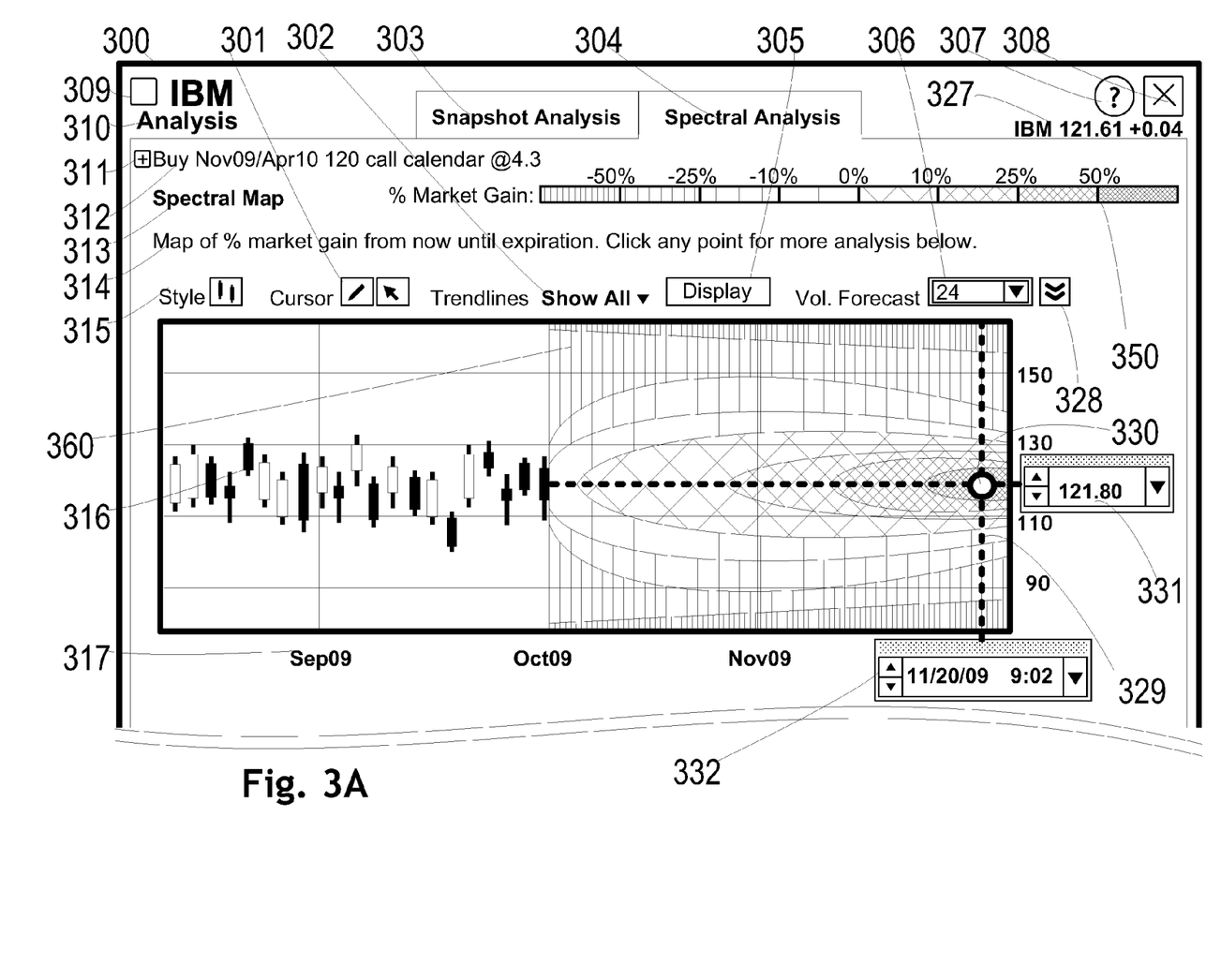
FIGS. 3A and 3B are a screen shots illustrating embodiments of Spectral Analysis for an option position.
Figure 3B:
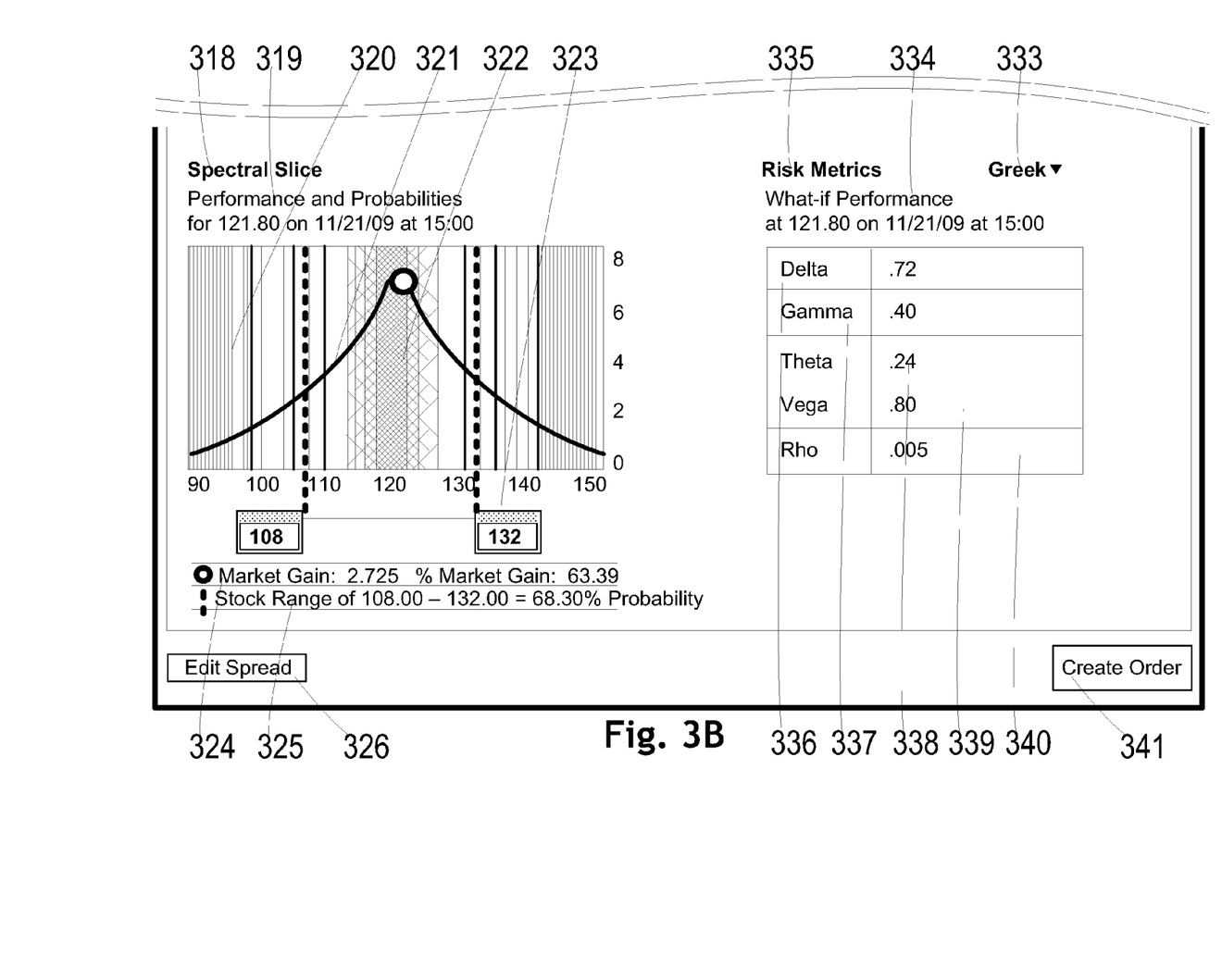

FIGS. 3A and 3B are screen shots illustrating embodiments of an Option Analysis dialog with the Spectral Analysis tab selected. In some embodiments, FIG. 3A comprises a top of a dialog or display window and FIG. 3B comprises a bottom of a dialog or display window. In the example shown in FIG. 3A, dialog 300 comprises the Option Analysis dialog. Cursor 301 comprises a cursor that enables a user to draw trendlines on the chart. Drop down 302 enables a user to select whether to display or hide or clear trendlines. Tab 303 enables a user to display the Snapshot Analysis dialog. Tab 304 enables a user to display the Spectral Analysis tab, which is selected in the figure. Button 305 enables a user to invoke a dialog for displaying earnings, splits and dividend dates. Drop down 306 enables a user to choose the volatility level for computing the Spectral Map overlay on the chart. Icon 307 enables a user to access help for the Option Analysis dialog. Icon 308 enables a user to close the dialog without any action being taken. Indictor 309 uses color to show how much the underlying security is up or down on the day. Text 310 comprises the title of the dialog. Icon 311 enables a user to click to get a detailed description of the individual instruments that make up the option position, in this case two option contracts make up the calendar spread. Description 312 comprises a description of the trade being analyzed, where "Buy" indicates the trade is a purchase, "10" is the quantity, "IBM" is the underlying symbol, "Nov09/Apr10" are the expiration dates, "120" is the strike price, "Call Calendar" is the type of spread and "@ 4.3" is the desired purchase price. Text 313 comprises the label for the chart. Text 314 comprises directions for the user. Drop down 315 changes the style of the chart, such as candle, line, area or bar. Chart 316 comprises a stock chart with the Spectral Map overlay. The chart displays the stock price path up to the current day as shown, and the Spectral Map illustrating the terrain of potential future option position prices based on date and underlying movement is overlaid between the current date and the expiration date of the option position. Scale 317 comprises the time scale of the chart. Text 327 indicates a live quote for the underlying instrument, in this case IBM stock. Button 328 is used to expand the size of Overlay 360. Overlay 360 is a Spectral Map overlay on stock chart 316 between the current day and the expiration day of the option strategy. Point 330 is a point specified by the user using controls 331 and 332 of FIG. 3B. Point 330 dictates the detail information displayed in chart 320 of FIG. 3B. Control 331 is used to specify a price point on chart 316. Control 332 is used to specify a date on chart 316.

In the example shown in FIG. 3B, text 318 comprises the label for the Spectral Slice area, which shows detailed analysis for a selected point on the chart 316 (e.g., point 330). Description 319 states for what date and price and volatility the Spectral Slice file chart is related to. Chart 320 comprises the Spectral Slice chart, which is a cross section of the Spectral Map along line 329. Line 321 comprises the Risk Profile line for the selected time, price and volatility. Band 322 comprises a band (e.g., different colors, hues, intensities, textures, etc.) that represent different levels of profitability of the position (e.g., deeper and deeper shades of green for more and more profit and deeper and deeper shades of red for more and more loss as shown also in the percentage market gain scale 350). Control 323 allows the user to specify a range of underlying prices and see the probability of being in the range bounded by those prices. The details of the probability calculation are shown in FIG. 11. Text 324 indicates the amount of profit, or the Market Gain, at the point 330 selected on chart 320. Text 325 displays the probability of the stock being in the range specified by control 323. Button 326 enables a user, when selected, to edit the spread. Control 333 is a toggle that lets the user switch between the mathematical display of risk parameters for the strategy and an English language display of risk parameters for the strategy. Text 334 describes the price and date to which the risk parameters displayed pertain. Title 335 displays the text 'Risk Metrics.' Text-number pair 336 represents delta, or the amount the strategy price moves given a $1 move in the underlying. Text-number pair 337 represents gamma, or the amount the delta moves given a $1 move in the underlying. Text-number pair 338 represents theta, or the amount the strategy price moves given 1 day of time elapsing. Text-number pair 339 represents vega, or the amount the strategy price moves given a 1% move in volatility. Text-number pair 340 represents rho, or the amount the strategy price moves given a 1% move in the risk free interest rate. Button 341 enables a user, when selected, to create an order ticket to trade the position.

In various embodiments, a user interacts with a spectral map 360 by one or more of the following:

Adjust implied volatility: For example, choose the 52 week high volatility, 52 week low volatility or enter a custom volatility. By adjusting implied volatility, the trader can see how the areas of profit and loss for the strategy grow or shrink and what impacts it has on the risk profile, probabilities and risk metrics;

Draw forecasts on the chart: User can draw trendlines to express a forecast visually of how the underlying might likely behave. For example, stay between two trendlines that form a channel. The user can then see easily where in the channel the option strategy experiences profits and losses;

Display overlays such as earnings and dividends: User can display markers for events such as earnings and dividends that will occur in the future and analyze the profit and loss areas at or near those points in time;

Edit the price of the strategy: User can edit the price of the strategy and view the impact on profit and loss areas;

Switch between strategies: If user is analyzing an adjustment to an existing position, user can toggle chart between starting position, adjustment trade, and final resulting position if the adjustment trade is made; and Select a point on the chart: user can click on the chart, type in a price and/or time and hit return, select a popular point in time such as date of next earnings from a drop down and/or select a popular price such as 52 week low of the underlying from a drop down, drag the price and time controls to desired place on the chart, use spinner controls to make small adjustments to time, price selections.

In various embodiments, a user interacts with a spectral slice chart 320 by:

User adjusting controls to select a range of underlying prices on the chart, and the system computes and displays the probability the underlying will be in that range at the point in time of the Spectral Slice (which is a cross section in time of the Spectral Map). The price, time and volatility inputs are derived from the interactions by the user on the spectral analysis component. The results are dynamically updated even as the user drags the time 332 and or the price 331 controls.

In various embodiments, a user interacts with risk metrics grid 335 by:

Clicking 333 to change view from greek numbers to verbal (English) explanations. The price, time and volatility inputs are derived from the interactions by the user on the spectral analysis component. The results are dynamically updated even as the user drags the time 332 and or the price 331 controls.

Figure 4:
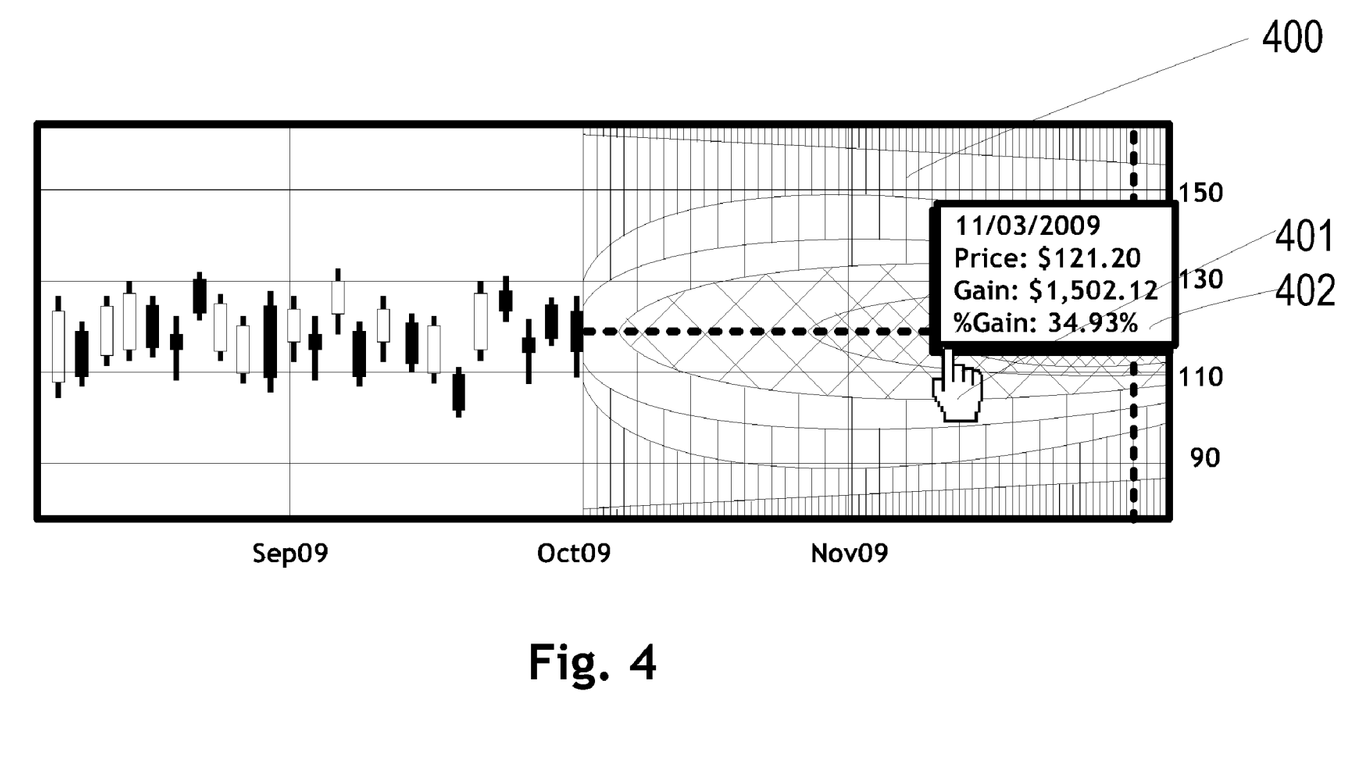
FIG. 4 is a screen shot illustrating an embodiment of a component displaying detail data for the point in the graph the user's cursor is over.

FIG. 4 is a screen shot illustrating the embodiment of a stock chart with a Spectral Map superimposed. In the example shown, Stock chart 400 shows the stock performance up to current day on the left and the Spectral Map superimposed from the current day up to the expiration of the option position on the right. Cursor 401 comprises a user's cursor rolling over a point on the chart where the spectral map is overlaid. Component 402 shows a tool tip which is invoked on rollover of a point on the spectral map area of the chart. Component 402 shows the price of the underlying and date related to the point the cursor is at and the amount of profit (or loss) and percentage profit (or loss) the option position will have at the (underlying price, date) point.

Figure 5:
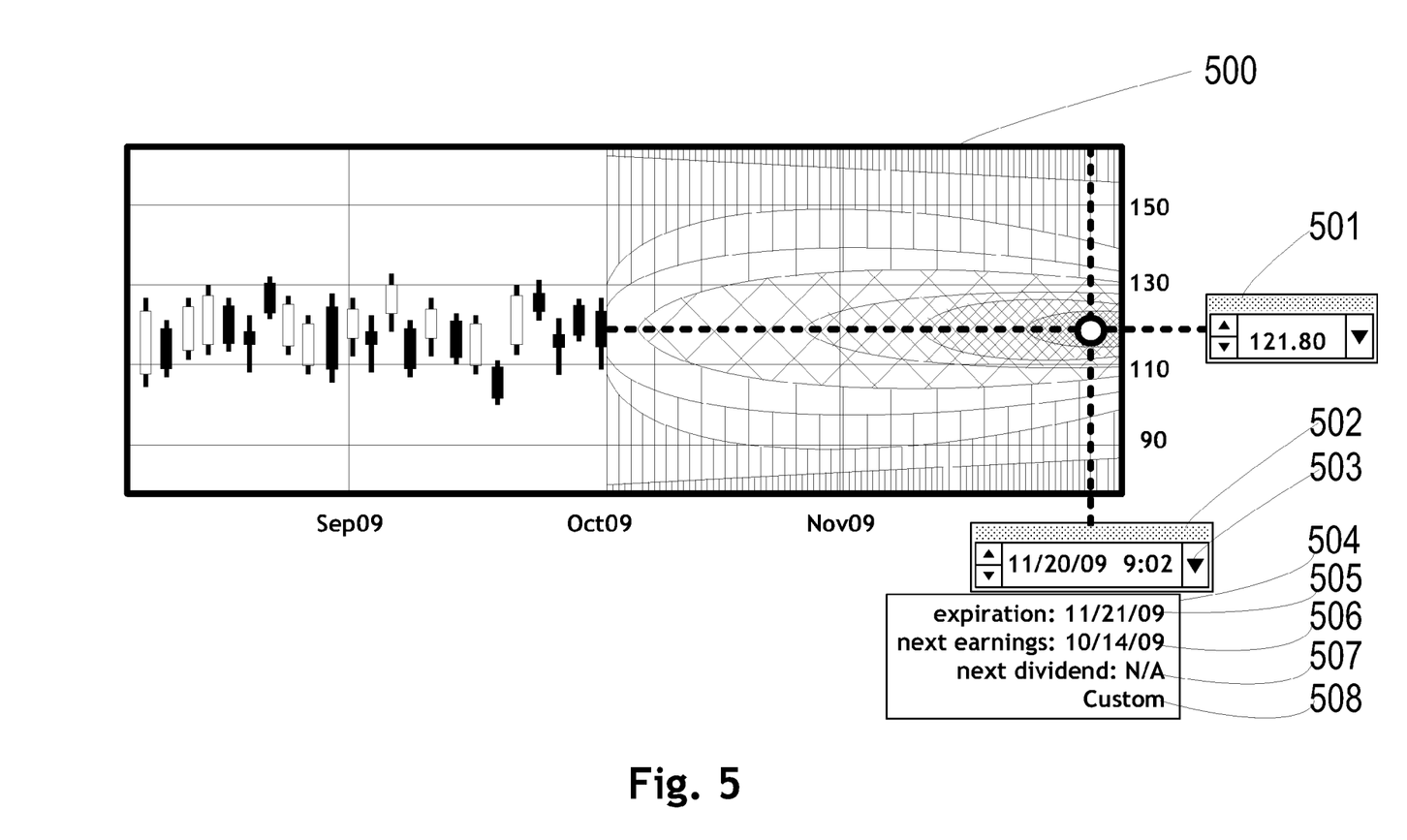
FIG. 5 is a screen shot illustrating an embodiment of a component for specifying a (time, price) point in the graph the user has selected.

FIG. 5 is a screen shot illustrating an embodiment of a component for specifying a date in the graph the user has selected. In the example shown, stock chart 500 shows the stock performance up to current day and the spectral map superimposed from the current day up to the expiration of the option position. Control 501 is used to specify a price point on the chart. Control 502 is used to specify a time point on the chart. Drop down button 503 is used to bring up date selection panel 504. Selection 505 shows the expiration date of the position. Selection 506 shows the next earnings announcement date for the underlying. Selection 507 shows the next dividend date for the underlying. Selection 508 allows the user to specify a custom date.

Figure 6:
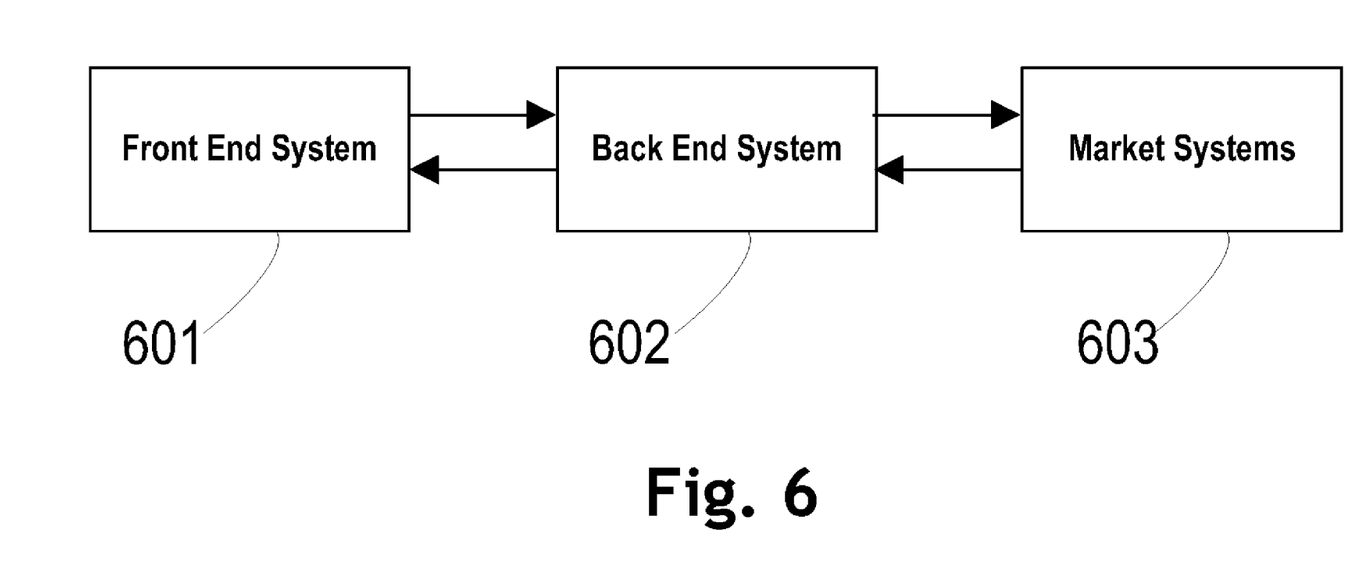
FIG. 6 is a diagram illustrating an embodiment of the high level parts of the trading system.

FIG. 6 is a diagram illustrating an embodiment of a trading system. In the example shown, end system 601 includes but is not limited to a user interface and components that support user interaction. Back end system 602 includes but is not limited to mechanisms for storage and retrieval of user and account data as well as systems for storing historical market data and performing analytic calculations. Market systems 603 include but are not limited to quote systems and order execution systems. In various embodiments, front end system 601, back end system 602, market systems 603 each comprise a server, a computer system, a single processor system, a multiprocessor system, one or more physical systems, a portion of a single system, a virtual system, a system including a memory and processor, or any other appropriate computer hardware and/or software. In various embodiments, a user accesses the system using a computer system, a mobile system, a network attached system, a wireless attached system, a cell phone attached system or device, a browser, or any other appropriate hardware and/or software for accessing the trading system.

Figure 7:
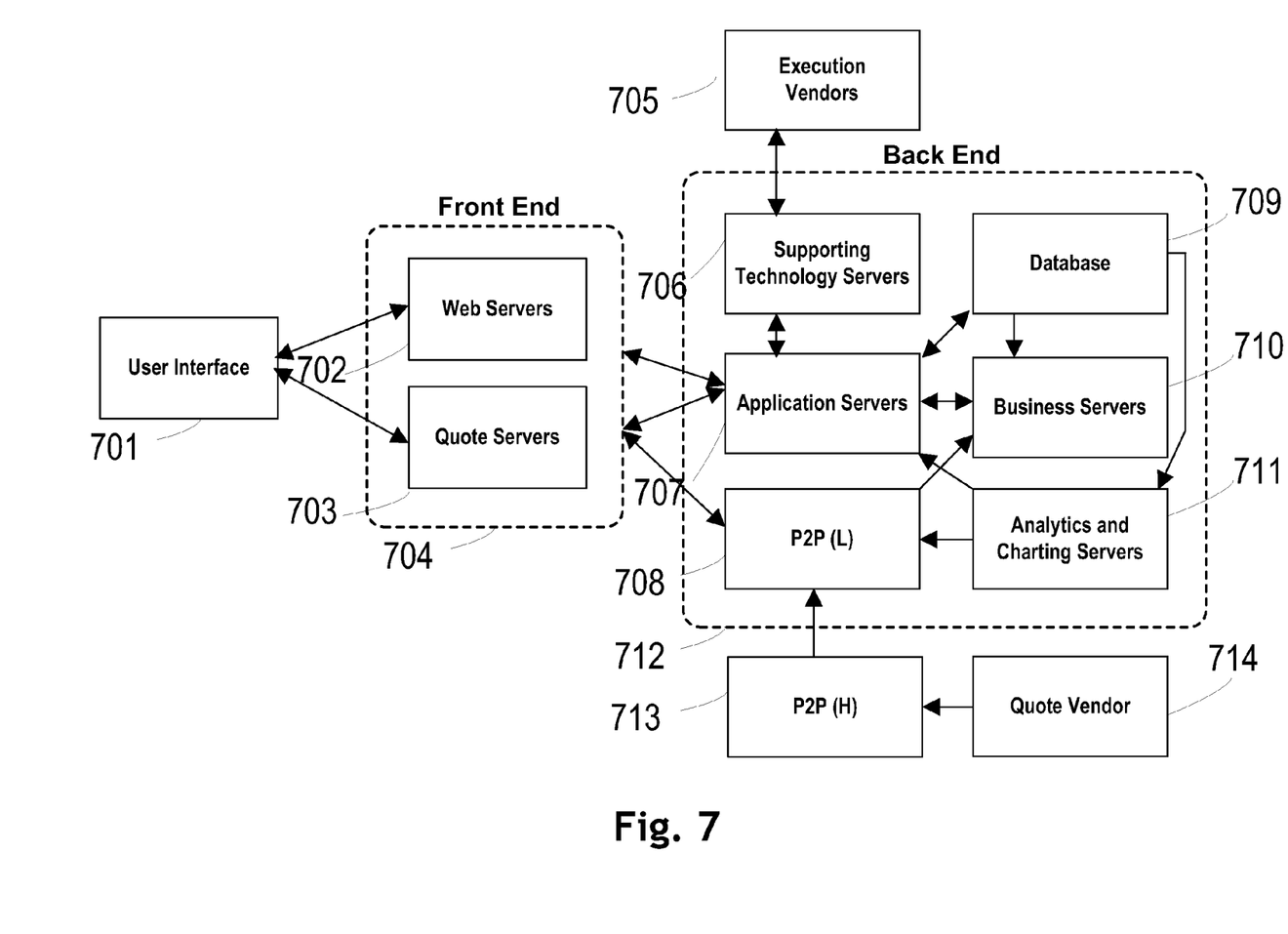
FIG. 7 is a flow diagram illustrating an embodiment of the high level components of the trading system.

FIG. 7 is a flow diagram illustrating an embodiment of a trading system. In the example shown, trading system includes user interface 701, front end 704, and back end 712. Front end 704 includes web servers 702 and quote servers 703. Quote servers 703 stream market data to the user interface. Execution Vendors 705 fill orders in the market from users as relayed via front end 704 and back end 712. Back end 712 includes Supporting Technology Servers 706; Application Servers 707, which provide application functions and services; P2P(L) 708, a peer to peer market data source; Database 708, which stores all user data including but not limited to positions, orders, strategy groupings, exit plans and balances; Business Servers 710; Analytics and Charting Servers 711, whose functions include providing risk metrics for positions and price charts; P2P(H) 713 comprises a market data source. Quote Vendor 714 is the source for market price quotes.

Figure 8:
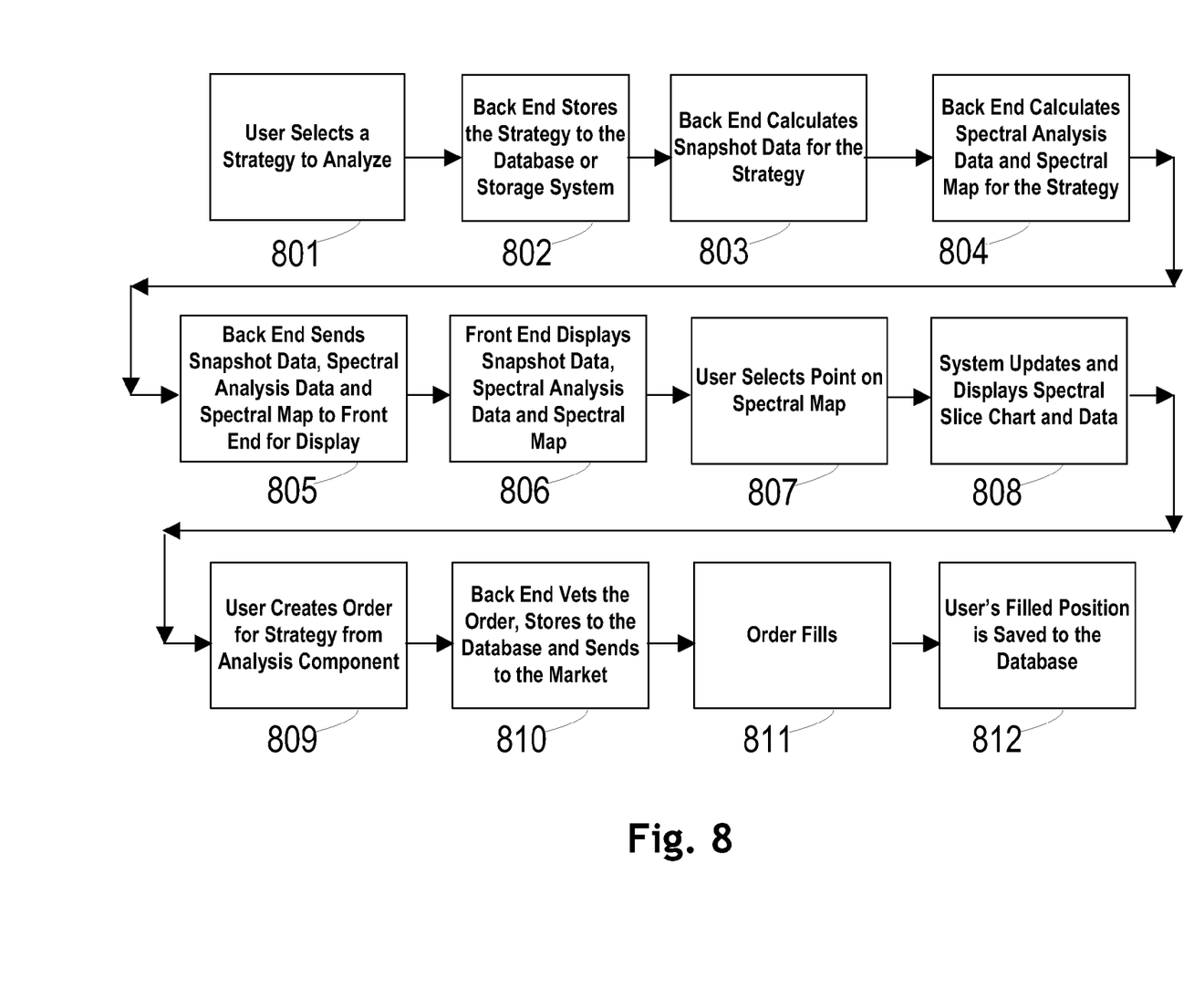
FIG. 8 is a flow diagram illustrating an embodiment of the process of using Option Analysis to evaluate and place a trade.

FIG. 8 is a flow diagram illustrating an embodiment of the process of using Option Analysis to evaluate and place a trade. In the example shown, In 801, a user selects a strategy to analyze. In 802, the Back End system stores the strategy to a database. In 803, the Back End calculates the snapshot data such as maximum gain, probability of profit and risk reward ratio. In 804, indicates the Back End calculates the spectral map data for the strategy. In 805, the Back End sends the snapshot data, the chart data and the spectral map data to the Front End for display. In 806, the Front End displays the snapshot, chart and spectral map data. In 807, the user interacts with the spectral map and choosing a point on the spectral map to get detail data. In 808, the system computes the Spectral Slice based on the user's selection in 807. In 809, the user creates an order for the strategy from the Option Analysis dialog. In 810, the Back End vets the order, storing it to a database and sending it to the market. In 811 indicates the order filling. In 812 indicates the user's filled position being saved to the database or storage system.

Figure 9:
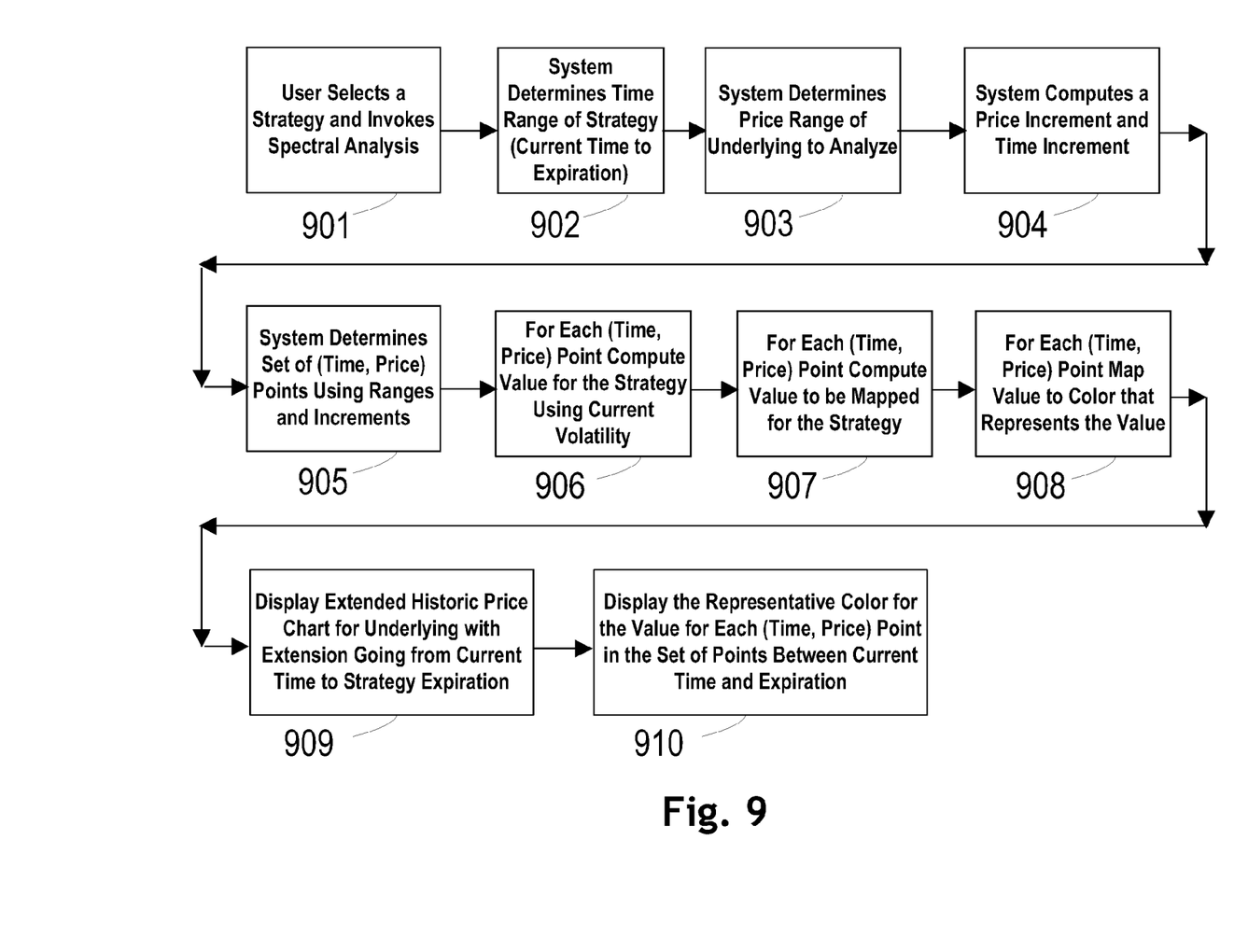
FIG. 9 is a flow diagram illustrating an embodiment of the process of computing the Spectral Map.

FIG. 9 is a flow diagram illustrating an embodiment of the process for computing a Spectral Map. In 901, a user selects a strategy and invokes spectral analysis. In 902, system determines the time range of the strategy, which will be the time from the current time until the time the strategy expires. In 903, system determines the price range of underlying to analyze. For example, the price range comprises a range of prices of the underlying instrument that comprise a range around the current price. In 904, the system computes a price increment and a time increment. For example, a means of dividing the time range and the price range into a set of discrete units is determined. In 905, system determines a set of discrete (time, price) points using ranges and increments. For example, the time and price range are given by the unit measure for each range. In 906, the Value is computed for the strategy for each (time, price) point using current volatility. In some embodiments, the Value comprises, but is not limited to, the price gain of the strategy at the (time, price) point. In various embodiments, the Value computed comprises a risk metric value—for example, delta, gamma, rho, vega, theta, or any other appropriate value related to the strategy at the (time, price) point. In 907, for each (time, price) point, the value to be mapped for the strategy is computed. In various embodiments, the computation includes an operation such as taking the percentage of the original Value or any other appropriate operation. In 908, for each (time, price) point, the value is mapped into a color that represents the value. In 909, extended historic price chart is displayed for underlying with extension going from current time to strategy expiration. For example, a display is created of a price chart where the left hand side of the chart exhibits price history and the right hand side of the chart represents a future set of (time, price) points. In 910, the representative color for the value is displayed for each (time, price) point in the set of points between the current time and expiration.

Figure 10:
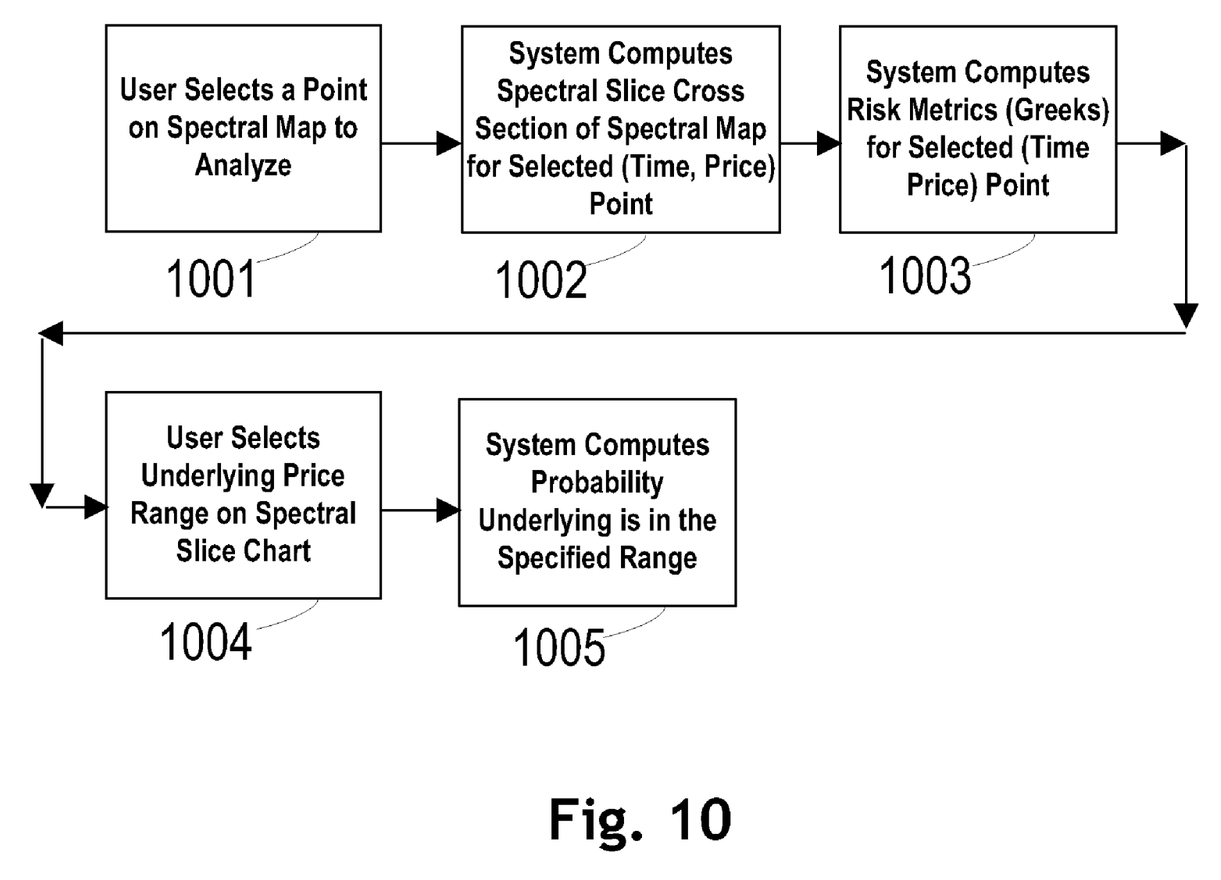
FIG. 10 is a flow diagram illustrating an embodiment of the process of computing a cross section of the Spectral Map called a Spectral Slice and related risk metrics.

FIG. 10 is a flow diagram illustrating an embodiment of the process for computing analysis data from the Spectral Map, including but not limited to the Spectral Slice and Greek risk metrics delta, gamma, theta, vega and rho. In the example shown, in 1001 the user selects a point on the Spectral Map to analyze. In 1002, of the system computes the Spectral Slice cross section of the Spectral Map for the selected (time, price) point. In 1003, of the system computes risk metrics for selected (time, price) point. In various embodiments, risk metrics comprise one or more of the following delta, gamma, rho, theta, vega, or any other appropriate risk metric. In 1004, user selects underlying price range on the Spectral Slice chart. In 1005, system computes the probability the underlying is in the specified range.

Figure 11:
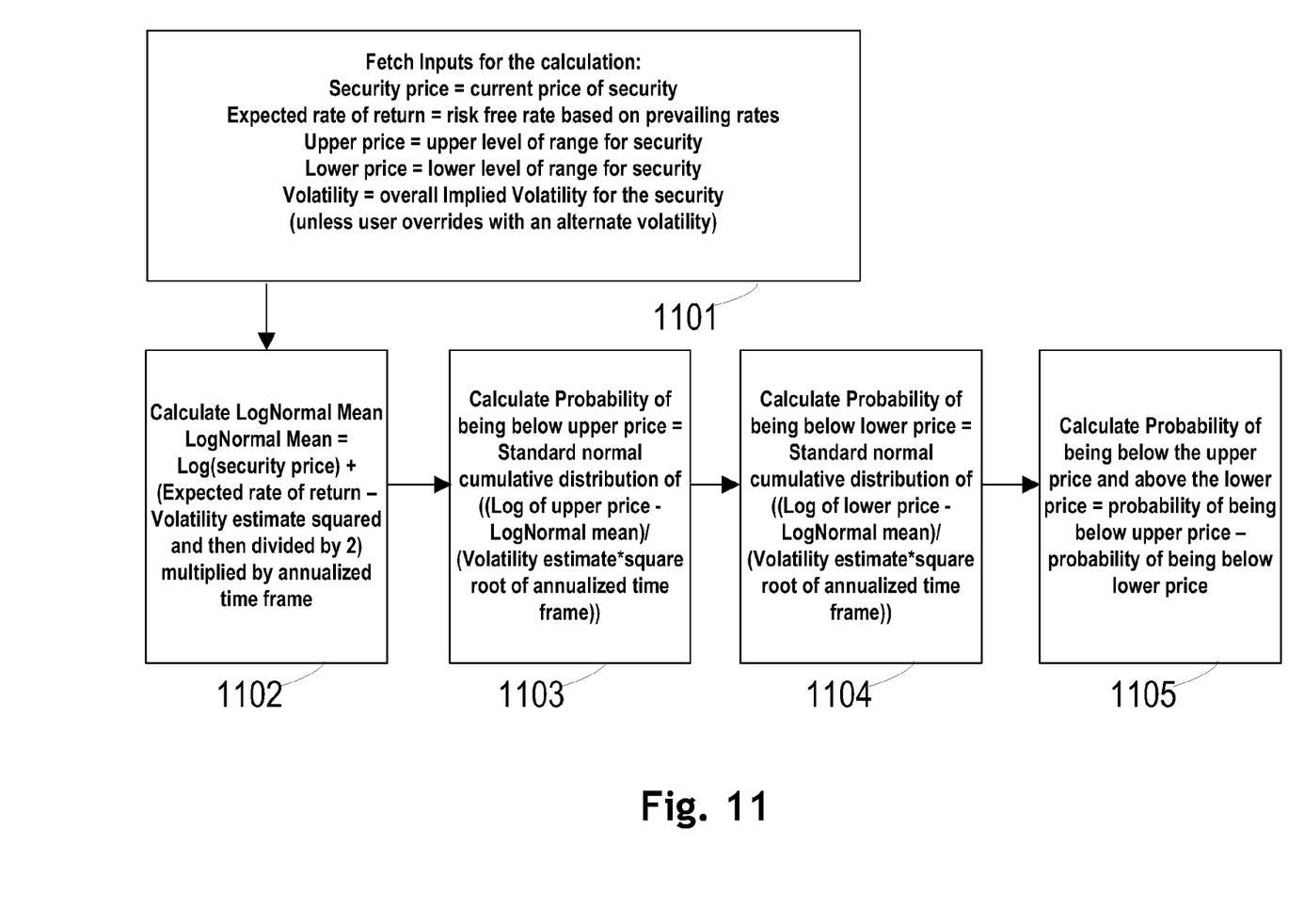
FIG. 11 is a flow diagram illustrating an embodiment of the process of calculating probability of a security price to be in a specified range at a particular point in time.

FIG. 11 is a flow diagram illustrating an embodiment of the process of calculating probability of a security price to be in a specified range at a particular point in time. In the example shown, in 1101 indicates the process of fetching the inputs for the calculation. In 1102, the LogNormal Mean is calculated. In 1103, the probability of being below the upper price is calculated. In 1104, the probability of being below the lower price is calculated. In 1105, the probability of being below the upper price and above the lower price is calculated.

In some embodiments, the computation steps are outlined as follows:
Fetch Inputs:
  Security price=current price of the security
  Expected rate of return=risk free rate based on prevailing rates
  Upper price=upper level of range for security
  Lower price=lower level of range for security
  Volatility=overall Implied Volatility for the security
  (unless user overrides with an alternate volatility)
Calculate LogNormal Mean:

> LogNormal Mean=Log(security price)+(Expected rate of return−Volatility estimate squared and then divided by 2) multiplied by annualized time frame Calculate the probability of being below the upper price:

> ProbBelow=Standard normal cumulative distribution of ((Log of upper price−LogNormal mean)/ (Volatility estimate*square root of annualized time frame))

Calculate the probability of being below the lower price:

> ProbAbove=Standard normal cumulative distribution of ((Log of lower price−LogNormal mean)/ (Volatility estimate*square root of annualized time frame))

Calculate the probability of being below the upper price and above the lower price:

> ProbBetween=probability of being below upper price−probability of being below lower price In various embodiments, calculations are based on discrete distributions, empirical distribution statistics, continuous distributions, or any other appropriate statistical or other calculation base for probabilities.

In some embodiments, analyzing an option comprises using a calculation to predict probable price outcomes based on volatility and statistical distributions of likely price outcomes and determine a strategy's (e.g., an option strategy) profitability. In some embodiments, a graphical tool displays the outcome to provide a matrix of outcomes for efficient conveyance of the model predictions to a user. In some embodiments, intuitive user adjustable parameters or diagnostics allow a user to adjust the predicted model/strategy and to display details of the predicted outcomes.

Figure 12A:
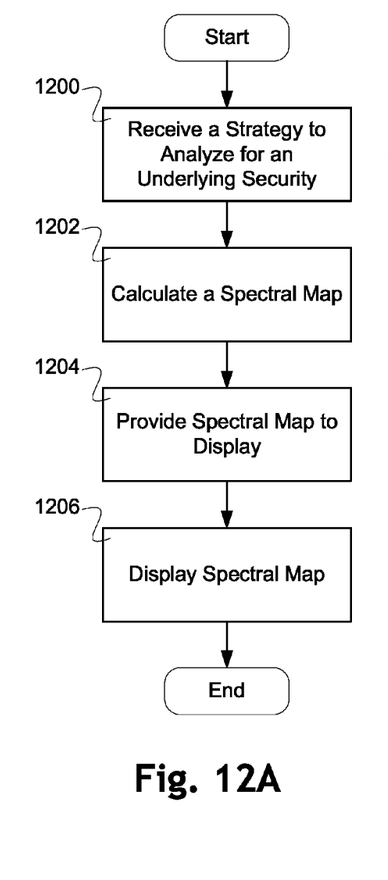
FIGS. 12A, 12B and 12C are flow diagrams illustrating embodiments of processes for displaying a spectral map, a point detail of the spectral map, and a spectral slice.
Figures 12B, 12C:
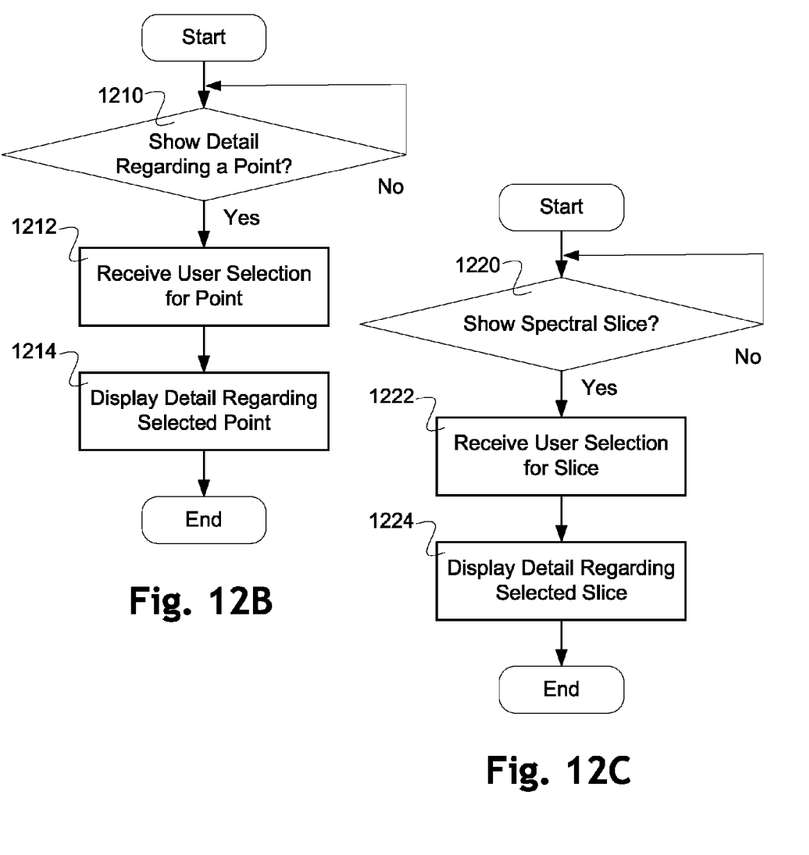

FIGS. 12A, 12B and 12C are flow diagrams illustrating embodiments of processes for displaying a spectral map, a point detail of the spectral map, and a spectral slice. In the example shown in FIG. 12A, in 1200 a strategy is received to analyze for an underlying security. In various embodiments, an underlying security comprises a stock, an option, an exchange traded fund, a mutual fund, an index, a currency, an asset, or any other appropriate underlying investment. In 1202, a spectral map is calculated. For example, a spectral map data is calculated for the underlying security at a grid of times and values of the underlying. In some embodiments, the spectral map is superimposed over an underlying price chart. The spectral map shows a potential future underlying investment price and a profit or a loss for the strategy. In some embodiments, the spectral map shows a potential future underlying investment price and one or more of the following: a profit or a loss, a delta, a gamma, a theta, a vega, or a rho for the strategy, or any other appropriate metric. In 1204, a spectral map is provided to a display. In 1206, the spectral map is displayed.

In the example shown in FIG. 12B, in 1210 it is determined whether it desired to show detail regarding a point. In 1212, a user selection for a point is received. In various embodiments, the user selection of a point comprises a user using one of the following: a movable crosshair, a single axis arrow control, a spinner control, a 52 week low price, a 52 week high price, a text entry box for a time or a price, or any other appropriate manner of selecting a point. In 1214, detail regarding the selected point is displayed.

In the example shown in FIG. 12C, in 1220 it is determined whether it desired to show detail regarding a spectral slice. In 1222, a user selection for a slice is received. In some embodiments, a slice is selected by dragging a line control over the spectral map. In 1224, detail regarding the selected slice is displayed. The spectral slice display indicates a performance and a probability of the performance of the underlying security. In some embodiments, the spectral slice display indicates a probability that the underlying security is in a range of prices.

In various embodiments, the spectral map adjusts, or recalculates the displayed spectral map, for a user selected volatility, a selected trend line or specified trend line, a selection to display an overlay (e.g., an earnings overlay and/or a dividend overlay, where the overlay shows where earnings and dividend dates in the future are anticipated), a change in selected strategy (e.g., the original strategy, a proposed adjustment or the adjusted strategy). In various embodiments, the spectral map shows bands that represent a predicted level of profitability of the strategy for the underlying investment by indicating the different predicted levels using a color, a hue, an intensity, a texture, a crosshatching or any other appropriate manner of indicating a band.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for option analysis, comprising:
   a processor configured to:
      receive a selection of a strategy to analyze for an underlying security;
      calculate a spectral map data for the strategy for the underlying security; and
      provide the spectral map data for the strategy to a display;
      cause the display to display a spectral map using the spectral map data, wherein the spectral map comprises a map of a value of the strategy at a plurality of times at a plurality of values of the underlying security, wherein the spectral map is superimposed over an underlying price chart, wherein the spectral map shows a potential future underlying investment price and one or more of the following: a profit or a loss, a delta, a gamma, a theta, a vega, or a rho for the strategy, wherein the delta comprises a delta-amount a price of the strategy moves given a $1 move in the underlying security, wherein gamma comprises a gamma-amount the delta moves given a $1 move in the underlying security, wherein the theta comprises a theta-amount the price of the strategy moves given 1 day of time elapsing, wherein the vega comprises a vega-amount the price of the strategy moves given a 1% move in a volatility, wherein a rho comprises a rho-amount price moves given a 1% move in a risk-free interest rate; and a memory coupled to the processor and configured to provide the processor with instructions.

2. A system as in claim 1, wherein a detailed information display shows detailed information regarding a point of the spectral map.

3. A system as in claim 2, wherein the point is selected by a user control.

4. A system as in claim 3, wherein the user control comprises one of the following: a movable crosshair, a single axis arrow control, a spinner control, a 52 week low price, a 52 week high price, or a text entry box for a time or a price.

5. A system as in claim 1, wherein a spectral slice display is selectable by dragging a line control over the spectral map.

6. A system as in claim 5, wherein the spectral slice display indicates a performance and a probability of the performance of the underlying security.

7. A system as in claim 6, wherein the spectral slice display indicates a probability that the underlying security is in a range of prices.

8. A system as in claim 1, wherein the processor is further configured to adjust a volatility for the spectral map.

9. A system as in claim 1, wherein the processor is further configured to display trend lines on the spectral map.

10. A system as in claim 1, wherein the processor is further configured to display an earnings overlay, a dividends overlay, or an earnings and dividends overlay.

11. A system as in claim 1, wherein the processor is further configured to display a change to the spectral map as a result of a change in a price of the strategy.

12. A system as in claim 1, wherein the processor is further configured to display a change to the spectral map as a result of a change of the strategy.

13. A system as in claim 1, wherein the spectral map displays bands that represent a predicted level of profitability of the strategy for the underlying.

14. A system as in claim 13, wherein the band is indicated using one or more of the following: a color, a hue, an intensity, a texture, or a crosshatching.

15. A method for option analysis, comprising:
receiving a selection of a strategy to analyze for an underlying security;
calculating, using a processor, a spectral map data for the strategy for the underlying security;
providing the spectral map data for the strategy to a display; and
causing the display to display a spectral map using the spectral map data, wherein the spectral map comprises a map of a value of the strategy at a plurality of times at a plurality of values of the underlying security, wherein the spectral map is superimposed over an underlying price chart, wherein the spectral map shows a potential future underlying investment price and one or more of the following: a profit or a loss, a delta, a gamma, a theta, a vega, or a rho for the strategy, wherein the delta comprises a delta-amount a price of the strategy moves given a $1 move in the underlying security, wherein gamma comprises a gamma-amount the delta moves given a $1 move in the underlying security, wherein the theta comprises a theta-amount the price of the strategy moves given 1 day of time elapsing, wherein the vega comprises a vega-amount the price of the strategy moves given a 1% move in a volatility, wherein a rho comprises a rho-amount price moves given a 1% move in a risk-free interest rate.

16. A computer program product for option analysis, the computer program product being embodied in a non-transitory computer readable storage medium and comprising computer instructions for:
receiving a selection of a strategy to analyze for an underlying security;
calculating a spectral map data for the strategy for the underlying security;
providing the spectral map data for the strategy to a display; and
causing the display to display a spectral map using the spectral map data, wherein the spectral map comprises a map of a value of the strategy at a plurality of times at a plurality of values of the underlying security, wherein the spectral map is superimposed over an underlying price chart, wherein the spectral map shows a potential future underlying investment price and one or more of the following: a profit or a loss, a delta, a gamma, a theta, a vega, or a rho for the strategy, wherein the delta comprises a delta-amount a price of the strategy moves given a $1 move in the underlying security, wherein gamma comprises a gamma-amount the delta moves given a $1 move in the underlying security, wherein the theta comprises a theta-amount the price of the strategy moves given 1 day of time elapsing, wherein the vega comprises a vega-amount the price of the strategy moves given a 1% move in a volatility, wherein a rho comprises a rho-amount price moves given a 1% move in a risk-free interest rate.

* * * * *